UNITED STATES PATENT OFFICE.

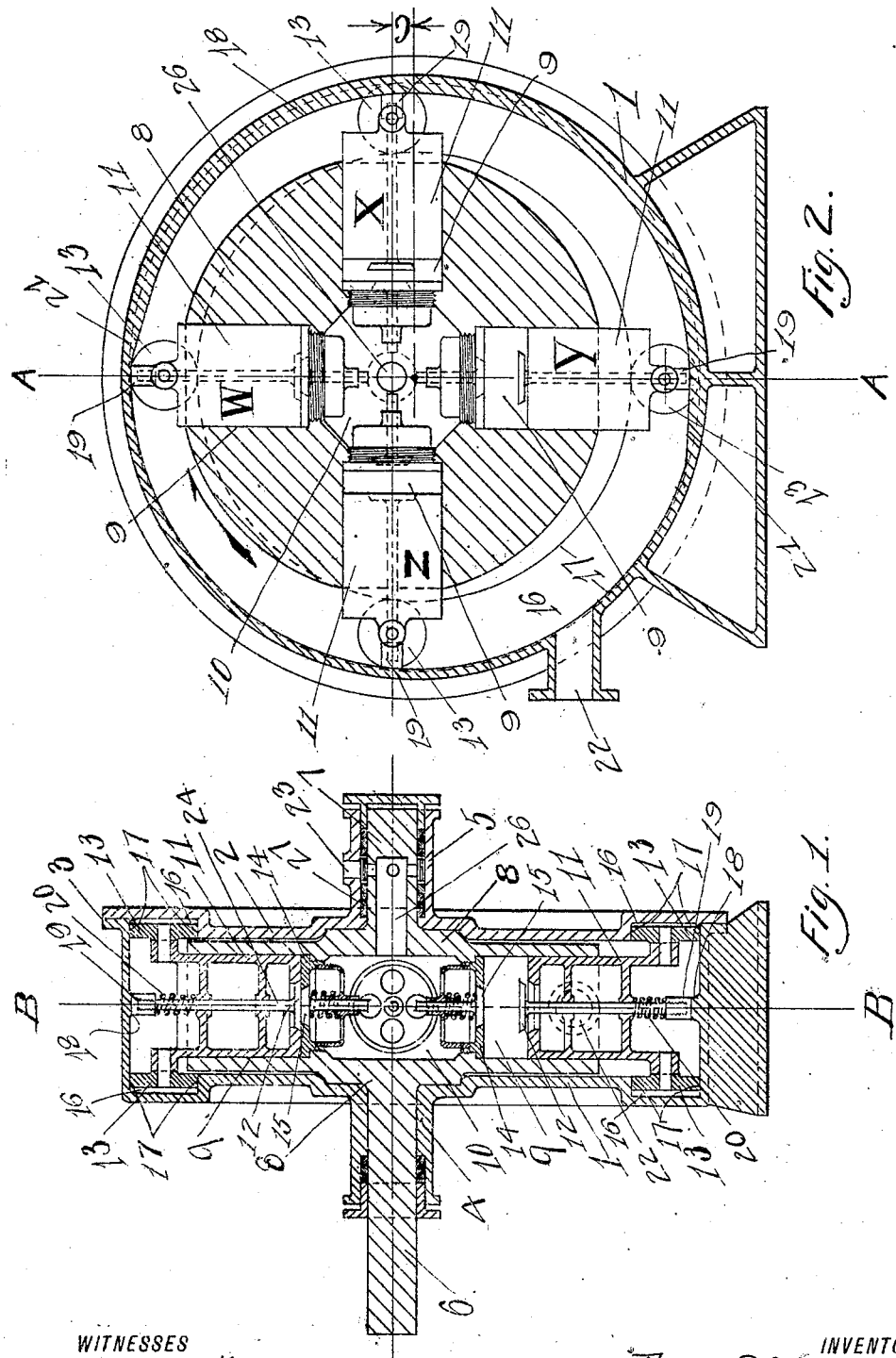

DAVID E. HAIRE, OF PHILADELPHIA, PENNSYLVANIA.

GASEOUS-FLUID COMPRESSOR.

935,655.  Specification of Letters Patent.  Patented Oct. 5, 1909.

Application filed December 11, 1908. Serial No. 466,992.

*To all whom it may concern:*

Be it known that I, DAVID E. HAIRE, a citizen of the United States of America, residing in the city of Philadelphia and State of Pennsylvania, have invented a certain new and useful Improvement in Gaseous-Fluid Compressors, of which the following is a true and exact description, reference being had to the accompanying drawings, which form a part thereof.

My improvement relates to the class of compressors known as the rotary type, and has for its object the production of a high speed apparatus, resulting in large capacity for small size and weight.

I am aware that attempts have been made to produce high-speed compressors, the results, however, have not been satisfactory, chiefly owing to the inability of the suction valves to respond quickly enough to the reciprocations of the piston; and another object of my invention is to overcome this trouble.

Referring now to the drawings in which similar reference characters refer to similar parts:—Figure 1, is a transverse section on line A—A Fig. 2, of one form of embodiment of compressor illustrating my invention. Fig. 2, is a longitudinal section, on line B—B, Fig. 1.

In detail 1 is a preferably circular casing forming the exterior shell of the illustrated form of compressor, closed by a removable wall or cover 2, made tight at the flange 3. Integral with the casing, is the packed bearing 4, a similar bearing 5 forming part of the cover. Supported by these bearings are the shafts 6 and 7, integral with, or rigidly attached to, a cylinder hub 8, which can thus be revolved within the casing, by applying rotating forces of any kind to the shaft 6. The center line of the shafts 6 and 7, is placed a distance C, Fig. 2, from the center of the casing, for a purpose that will be described later on. Within the hub 8, are one or more, for example four cylindrically bored recesses 9, all communicating with an interior space or chamber 10 occupying the center of the hub. Free to reciprocate within each cylindrical recess 9 is a piston 11, carrying the suction valve 12 and the two rollers 13, as plainly shown. At the inner end of each recess 9 is screwed a discharge valve-seat 14, carrying the valve 15. Near the periphery of the casing and preferably concentric with it are two interior grooves 16, one on each casing wall and forming the finished roller paths or cams 17, for the rollers 13, 13. Upon rotating the hub 8 with the pistons and rollers in position, a reciprocating motion will be given each piston. With the precise details shown the length of this movement will be double the distance C; each piston being at the inner end of its stroke when at the top center line, this position being on Fig. 2 marked W, and at the outer end of its stroke when at the bottom center line, position marked Y.

For operating suction valve 12 the following details are preferable. A valve stem 24 has a slipper piece 19 on its outer end to be engaged by a proper cam or path for opening the valve, while a spring 20 tends always to close it.

For substantially one-half of the inner circumference of the casing 1 and preferably concentric therewith is a true bearing path 18, which acts upon the slipper-piece 19, the other half of the casing circumference having no action but so formed as to permit spring 20 to close the valve. Thus the motions of the piston and suction valve are controlled by separate means. As the paths 17 and 18 are struck to the same center, it of course follows that any difference in radius will be constant at all points of the path, and hence the suction valve 12 may be held open any fixed amount desired during rotation. As the path 18 extends only one-half a circumference, the suction valve remains open and closed for one-half a revolution respectively, its motions being produced by the mutual reactions of the path 18 and spring 20. The entry and exit to the path 18, are made gradual, as shown at 21, to avoid shock.

The gas enters the compressor at the inlet 22 and leaves at orifice 23. A spring-pressed discharge valve 15 permits the air or gas compressed by piston 11 to escape into the central space 10, and thence through passage or duct 26 in shaft 7 to an annular opening communicating with orifice 23.

In operation, starting on the top center, position W, with the piston at its innermost position, and rotating in direction of arrow, the piston and suction valve begin to move out, owing to the eccentricity C. of the centers of rotation and of the roller paths. The radii of the paths are so arranged by construction that the piston moves outwardly a definite distance in excess of that moved by the suction valve, resulting in opening the valve as shown at position X. When position Y is reached, the piston has reached its extreme outward movement, and upon the slipper-piece 19 leaving the path 18 at the slope 21, the suction valve 12 closes by reaction of the spring 20. Thus during half a revolution, the piston has been moving out, with the suction valve open, resulting in the cylinder 9 being filled with gas from the interior of the casing. From position Y back to W, the piston moves inwardly, the suction valve remaining closed. The gas is compressed forcing open the discharge valve 15, and enters the chamber 10, from which it flows to the discharge orifice 23, by way of the ducts 26 in the shaft 7, as clearly shown. Leakage along the shaft 7 and into the casing is stopped by the packing 27. To recapitulate, there is an outward or suction stroke during half a revolution, and an inward or compression stroke during the remaining half revolution, the cylinder being single acting; and as the motions of the piston and suction valve are produced solely by contact with the stationary roller paths 17 and 18, it is quite obvious that the number of working cylinders may be multiplied without complicating the apparatus, each cylinder standing as a distinct, separate and independent unit. The drawings show four cylinders, chiefly to illustrate the relative positions of the parts at the four principal points in the cycle of operation.

It is obvious that at high speeds centrifugal force will play an important part in the operation of this machine. The tendency will be for the loose parts (the piston and suction valve) to press outwardly against the roller paths, with great force, thus eliminating all lost motion, and producing smooth running.

The suction valve is positively opened at the proper point, and closed both by the spring and centrifugal force, thus avoiding the trouble with suction valves in other forms of quick running compressors. The clearance between the piston 11 and bottom of recess 9 is minimized, to the betterment of efficiency.

Various minor details may be added to this machine to improve its practical efficiency, such as ball bearings, at bearings 4 and 5, and on the axles of the rollers 13. The roller paths 17 and 18 may be constructed of removable strips of hardened steel to reduce wear and facilitate renewal. Water jackets may be applied to the casing and bearings. Handhole plates may be located in the casing 1, for convenient access to the pistons and rollers, for adjustment, cleaning and repairs, etc.; but it is considered unnecessary to complicate the drawings and description with such matters, which only tend to cloud the clear presentation of the essentials.

Having now described my invention, what I claim as new and desire to secure by Letters Patent is:

1. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, and a device having connection with said suction valve adapted for positively opening the latter.

2. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, a spring for closing the same when running at slow speed, and a device having connection with said suction valve adapted for positively opening the latter.

3. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, a stationary valve-cam for positively opening said valve and a device, as a roller, carried by said valve or valve stem, for engaging said valve-cam.

4. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, a spring for closing the same when running at slow speed, a stationary valve-cam for positively opening said valve and a device, as a roller, carried by said valve or valve stem, for engaging said valve-cam.

5. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, a device having connection with said suction valve adapted for positively opening the latter; a central discharge chamber having an axial discharge therefrom, a spring valve for discharging each cylinder into said chamber, and a stationary suction chamber formed by an exterior casing inclosing the revolving parts.

6. In a high-speed gaseous-fluid compressor, the combination of one or more cylinders revoluble in unison about a common axis, a piston reciprocable within each cylinder, a mechanism engaging all of said pistons for controlling the reciprocation thereof, a suction valve in each piston adapted to be positively opened inward and in a substantially radial direction whereby centrifugal force tends to close the same, a spring for closing the same when running at slow speed, a stationary valve-cam for positively opening said valve, a device, as a roller, carried by said valve or valve stem, for engaging said valve-cam; a central discharge chamber having an axial discharge therefrom, a spring valve for discharging each cylinder into said chamber, and a stationary suction chamber formed by an exterior casing inclosing the revolving parts, and supporting said stationary cam.

7. In a high-speed gaseous-fluid compressor, the combination of a series of radially arranged cylinders revoluble in unison about a common axis, a single acting piston reciprocable within each cylinder, a stationary, substantially circular piston-operating cam having opposed surfaces, a device for each piston, such as a roller carried by the piston, engageable with both surfaces of said cam for effecting or controlling the reciprocation of the piston, a suction valve in each piston for permitting inward flow of fluid and having means for controlling the same, a central discharge chamber, and a spring-controlled discharge valve for discharging each cylinder into the central chamber.

8. In a high-speed gaseous-fluid compressor, the combination of a series of radially arranged cylinders revoluble in unison about a common axis, a piston reciprocable within each cylinder, a stationary, substantially circular piston-operating cam having opposed surfaces, a device for each piston, such as a roller carried by the piston, engageable with both surfaces of said cam for effecting or controlling the reciprocation of the piston, a suction valve having means for controlling the same, a central discharge chamber, a spring-controlled discharge valve for discharging each cylinder into the central chamber, an axial discharge from said central chamber, and a stationary suction chamber formed by an exterior casing inclosing the revolving parts, and supporting the two stationary cam surfaces mentioned.

9. In a high-speed gaseous-fluid compressor, the combination of one or more cylinders revoluble in unison about a common axis, a central chamber into which they all discharge, a piston reciprocable within each cylinder, a mechanism engaging all of said pistons for controlling the reciprocation thereof, the same comprising a stationary and substantially circular cam path eccentric to the cylinder's revolution, having two opposed surfaces for actuating the pistons, and mechanical connections extending from each piston to said cam path whereby the latter controls the reciprocation of the former; a suction valve in each piston adapted to be positively opened inward and in a substantially radial direction whereby centrifugal force tends to close the same, and a device having connection with said suction valve adapted for positively opening the latter.

10. In a high-speed gaseous-fluid compressor, the combination of one or more cylinders revoluble in unison about a common axis, a central chamber into which they all discharge, a piston reciprocable within each cylinder, a mechanism engaging all of said pistons for controlling the reciprocation thereof, the same comprising a stationary and substantially circular cam path eccentric to the cylinder's revolution, having two opposed surfaces for actuating the pistons, and mechanical connections extending from each piston to said cam path whereby the latter controls the reciprocation of the former; a suction valve in each piston adapted to be positively opened inward and in a substantially radial direction whereby centrifugal force tends to close the same, a spring for closing the same when running at slow speed, a stationary valve cam for positively opening said valve and a device, as a roller, carried by said valve or valve stem for engaging said valve cam.

11. In a high-speed gaseous-fluid compressor, the combination of a series of radially arranged cylinders revoluble in unison about a common axis, a piston reciprocable within each cylinder, a stationary, substantially circular piston-operating cam having opposed surfaces, a device for each piston, such as a roller carried by the piston, engageable with both surfaces of said cam for effecting or controlling the reciprocation of the piston, a suction puppet valve in each piston, adapted to be positively opened inward and in a substantially radial direction whereby centrifugal force tends to close the same, a stationary valve cam for positively opening said valve, a device as a roller carried by each suction valve or its stem for engaging said valve cam, a suction valve closing device, as a spring, whose action is augmented by centrifugal force in an amount varying with the speed of revolution, a central discharge chamber, a spring-controlled puppet discharge valve for discharging each cylinder into the central chamber, an axial discharge from said central chamber, and a stationary suction chamber formed by an exterior casing inclosing the revolving parts, and supporting the two stationary cams mentioned.

In testimony whereof I have signed my name to this specification, in the presence of two subscribing witnesses, on the 10th day of December, 1908.

DAVID E. HAIRE.

Witnesses:
 ADOLPH F. SCHMIDT,
 BARTON H. COFFEY.